No. 868,893.
PATENTED OCT. 22, 1907.
W. SEIBERT.
ROTARY ENGINE.
APPLICATION FILED MAR. 27, 1907.
2 SHEETS—SHEET 1.
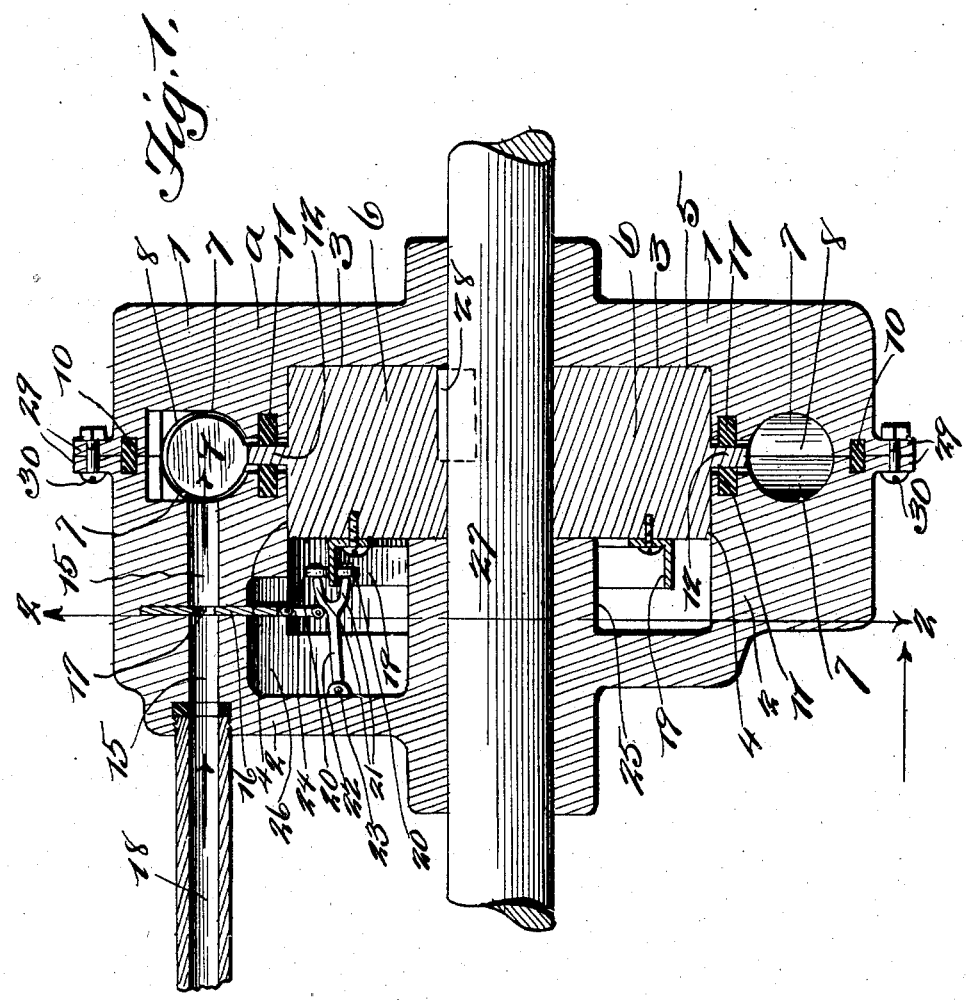
WITNESSES:
INVENTOR
W<sup>m</sup> Seibert,
By Dean Swift
Attorney

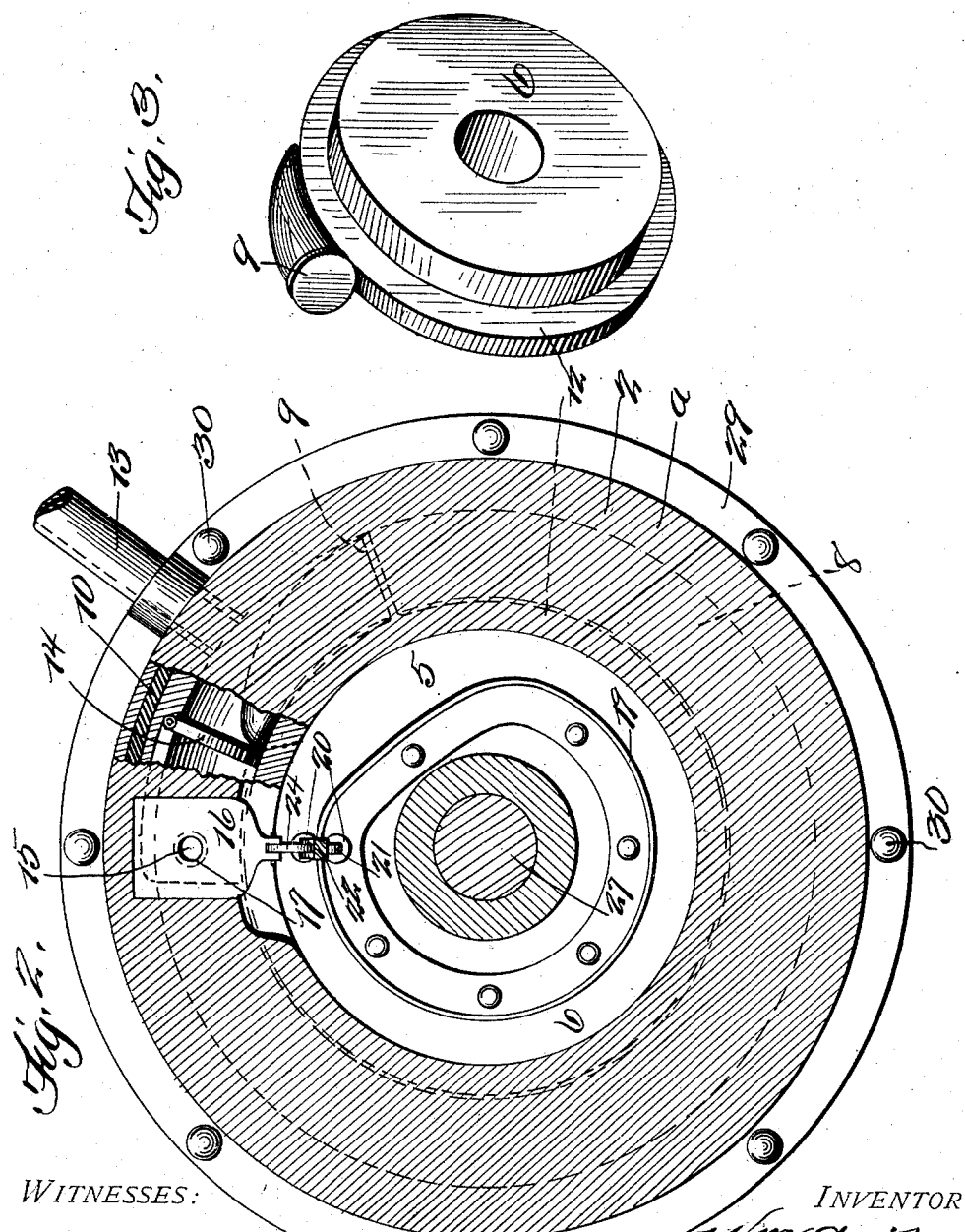

UNITED STATES PATENT OFFICE.

WILLIAM SEIBERT, OF ERIE, KANSAS.

ROTARY ENGINE.

No. 868,893.  Specification of Letters Patent.  Patented Oct. 22, 1907.

Application filed March 27, 1907. Serial No. 364,759.

*To all whom it may concern:*

Be it known that WILLIAM SEIBERT, a citizen of the United States, residing at Erie, in the county of Neosho and State of Kansas, has invented certain new and useful Improvements in Rotary Engines, of which the following is a specification, reference being had therein to the accompanying drawing.

This invention pertains to a new and useful rotary engine and in connection with an apparatus of the above type, the invention aims as a primary and essential object to provide a device of this character, by which the inlet for the steam is controllable by a sliding valve, which is controlled by the rotatable head carrying the piston. The chamber in which the piston travels is provided with a gravitating gate, which swings up when struck by the piston, and closes by gravity behind said piston, and is held closed by the inflow of steam; in other words, a check valve.

This invention is provided with an exhaust port, and aims as a further object to provide a device of this type, which is simple and efficient in construction, as well as being inexpensive to manufacture.

This invention comprises further objects and combinations of elements which will be hereinafter more fully described, shown in the accompanying drawings, and the novel features thereof will be pointed out by the appended claims.

To obtain a full and correct understanding of the details of construction, combinations of features, elements and advantages, reference is to be had to the hereinafter set forth description and the accompanying drawings in connection therewith, wherein Figure 1 is a sectional view through the rotary engine, illustrating the invention. Fig. 2 is a sectional view on line 2—2 of Fig. 1, illustrating in dotted lines, the steam chamber, the exhaust port and the piston. Fig. 3 is a detail perspective view of the rotatable head, and the piston carried therewith.

Making renewed reference to the accompanying drawings wherein similar reference characters indicate corresponding parts in the several illustrations, by figures, *a* designates the casing of the rotary engine, which comprises two sections 1 and 2; the section 1 being considerably shallower than the section 2, the adjacent faces of the said sections are recessed, as at 3 and 4, which form the chamber 5, in which the rotatable head 6 rotates. At a diameter greater than the diameter of the outer wall of the said chamber, the said adjacent faces are provided with concentric recesses 7, which are semi-circular in cross section, and when the sections are placed against one another, the said recesses 7 form a steam chamber 8, in which the piston 9, carried by the rotatable head 6, travels; this piston is conical in side view, and its lower circumference is concentric with the center of the rotatable head, as will be depicted from the drawings.

The adjacent faces of the sections are provided with suitable packing 10 and 11, so as to prevent the escapement of steam, and the circumferential rib 12 travels between the said packing 11, as will be observed from the drawings. Leading from the steam chamber is an exhaust pipe 13, and positioned a little in front of the exhaust pipe, that is, where it communicates with the steam chamber, is a gravitating gate or check valve 14, which closes by gravity, behind the piston, as it passes, and is held closed by the inflow of steam, through the inlet 15, as is apparent from the drawings. This inlet 15 is provided with a sliding valve 16 having an opening 17, to register with the inlet duct 18, when the inflow of steam is taking place. This sliding valve is controllable by the rotatable head, through the medium of the cam track 19, fastened by screws or any other suitable means to the head. This track is designed to be engaged by the anti-frictional rollers 20 which are loosely journaled on the forks 21 of the oscillatory lever 22, which is pivoted, as at 23, within a hollow portion of the section 2; this oscillatory lever has a pitman connection 24, with the sliding valve, thus it is plainly manifest how the inflow of steam is controlled so as to admit the steam and to shut it off at the proper time.

The inner wall of the recess 4 is recessed, as at 25, to receive the cam track 19, and this recess 25 is provided with an offset recess 26 to form a hollow portion of the section 2, in which the lever 22 is pivoted, as is illustrated in the drawings. The rotatable head is keyed to the shaft 27, as at 28, as also shown in the drawings; the two sections are bolted together by their circumferential flanges 29, by means of bolts 30, as is evident from an observation of the drawings.

It is to be understood that various changes and modifications may be employed in the construction and embodiment thereof, combinations of features, and elements, without in any way departing from the spirit and scope of the invention covered by the claims thereof; it being understood that whatever variations or modifications are employed must fall within the scope of the appended claims.

From the foregoing, the essential features, elements and the operation of the device, together with the simplicity thereof, will be clearly apparent, and, when manufactured in accordance with the invention, an inexpensive market will be easily obtained therefor.

Having thus fully described the invention, what is claimed as new and useful, by the protection of Letters Patent, is:—

1. In a device of the character described; a casing having a steam chamber; a head rotatable within said casing; said head having a piston designed to travel within said steam chamber; an inlet; an exhaust for the engine; said inlet having a sliding valve; said casing having a hollow portion; an oscillatory lever having anti-frictional rollers pivoted in said hollow portion; said lever having pitman connection with said sliding valve; said head having a cam track for operating said lever for controlling the sliding valve.

2. In a device of the character described; a casing comprising two sections; the adjacent faces of which are provided with two concentric recesses forming chambers; a rotatable head having a piston to rotate in one of said chambers while the piston carried by the head rotates in the other chamber; an inlet; an exhaust for the engine; said inlet having a sliding valve; one of said sections of the casing having a hollow portion; an oscillatory lever having anti-frictional rollers pivoted in said hollow portion; said lever having pitman connection with said sliding valve; said head having a cam track for operating said lever for controlling the sliding valve.

In testimony whereof I hereunto affix my signature in presence of two witnesses.

WILLIAM SEIBERT.

Witnesses:
 L. C. HAMBERN,
 R. C. JOHNSON.